US012651952B2

(12) United States Patent
Londak et al.

(10) Patent No.: US 12,651,952 B2
(45) Date of Patent: Jun. 9, 2026

(54) CURRENT SINKING SERIAL COMMUNICATION

(71) Applicant: SEMICONDUCTOR COMPONENTS INDUSTRIES, LLC, Scottsdale, AZ (US)

(72) Inventors: Pavel Londak, Hutisko Solanec (CZ); Jan Matej, Ostrava (CZ); Richard Plesek, Hodslavice (CZ); Marek Bek, Koprivnice (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 3 days.

(21) Appl. No.: 18/952,124

(22) Filed: Nov. 19, 2024

(65) Prior Publication Data

US 2026/0142549 A1     May 21, 2026

(51) Int. Cl.
*H02M 1/00* (2006.01)
*H02M 3/155* (2006.01)

(52) U.S. Cl.
CPC ......... *H02M 1/0012* (2021.05); *H02M 3/155* (2013.01)

(58) Field of Classification Search
CPC .... H02M 1/00; H02M 1/0012; H02M 1/0003; H02M 1/0006; H02M 1/0009; H02M 3/00; H02M 3/02; H02M 3/145; H02M 3/155
USPC ................................................. 327/540, 541
See application file for complete search history.

(56) References Cited

U.S. PATENT DOCUMENTS

| | | | |
|---|---|---|---|
| 9,293,220 B2 | 3/2016 | Chung | |
| 9,343,176 B2 | 5/2016 | Chung | |
| 9,515,556 B2 * | 12/2016 | Yang ..................... | H02M 3/156 |
| 11,669,482 B2 | 6/2023 | Crisp | |
| 12,394,971 B2 * | 8/2025 | Randazzo .............. | H02H 5/048 |
| 2023/0187922 A1 | 6/2023 | Randazzo et al. | |
| 2024/0201231 A1 | 6/2024 | Bernardon et al. | |

OTHER PUBLICATIONS

Extended European Search Report in European Patent Application No. 25154356.7, mailed Jul. 23, 2025, 12 pages.

* cited by examiner

*Primary Examiner* — Hai L Nguyen
(74) *Attorney, Agent, or Firm* — Dickinson Wright PLLC

(57) ABSTRACT

Current sinking serial communication. At least one example is a packaged semiconductor product comprising: an input terminal electrically accessible on an exterior surface; an output terminal electrically accessible on an exterior surface; a digital memory disposed within the packaged semiconductor product and configured to store a digital word; a functional circuit coupled to the input terminal, the output terminal, and the digital memory, the functional circuit configured to perform a control function with respect to a signal on the input terminal, and the control function modifiable based on the digital word; a sense circuit coupled to the output terminal, the sense circuit configured to extract binary data provided as current pulses drawn through output terminal; and a serial receiver coupled to the sense circuit, the serial receiver configured to accumulate the binary data into an updated digital word, and store the updated digital word to the digital memory.

16 Claims, 6 Drawing Sheets

*F*IG. 3

CURRENT SINKING SERIAL COMMUNICATION

CROSS-REFERENCE TO RELATED APPLICATIONS

Not Applicable.

BACKGROUND

Many electronic devices, such as application-specific integrated circuits, are programmable such that a single device may be used in several different applications. Programming such a device uses a pin or terminal as the mechanism to communicate with the internal memory. For devices with many terminals, a dedicated communication terminal may be used to program the internal memory. For devices with a limited number of terminals, an enable terminal may serve double-duty—in one sense acting as a communication terminal, and in another sense acting as the enable terminal to enable operation of the device. However, for three terminal devices, such as low dropout (LDO) voltage regulators, no pin or terminal is available for communication with the internal memory.

SUMMARY

On example is a packaged semiconductor product comprising: an input terminal electrically accessible on an exterior surface of a packaging; an output terminal electrically accessible on an exterior surface of a packaging; a digital memory disposed within the packaged semiconductor product and configured to store a digital word; a functional circuit coupled to the input terminal, the output terminal, and the digital memory, the functional circuit configured to perform a control function with respect to a signal on the input terminal, and the control function modifiable based on the digital word; a sense circuit coupled to the output terminal, the sense circuit configured to extract binary data provided as current pulses drawn through the output terminal; and a serial receiver coupled to the sense circuit, the serial receiver configured to accumulate the binary data into an updated digital word, and store the updated digital word to the digital memory.

In the example packaged semiconductor product, the functional circuit may further comprise a voltage regulator, and wherein a setpoint for the voltage regulator is controlled by at least a portion of the digital word. The packaged semiconductor product may have exactly three externally-accessible terminals, being the input terminal, the output terminal, and a ground or common terminal.

In the example packaged semiconductor product, the functional circuit may be a power device. The power device may be a transistor.

In the example packaged semiconductor product, the sense circuit may further comprise: a current mirror configured to create a sense current proportional to an output current provide through the output terminal; an impedance through which the sense current flows; and a comparator coupled to the impedance. The comparator may be configured to compare a sense voltage across the impedance to a reference voltage, and drive, to a compare output, voltage pulses representing the binary data.

Another example is a voltage regulator comprising: an input terminal; an output terminal; a power device coupled between the input terminal and the output terminal, and the power device defining a control input; and a controller coupled to the control input and the output terminal. The controller may be configured to: sense binary data communicated as current pulses drawn through the output terminal; store the binary data in a memory as a digital word; and control the power device based on the digital word.

In the example voltage regulator, the controller may further comprise: a current mirror associated with the power device and configured to generate a mirror current proportional to an output current provided to the output terminal; a sense circuit coupled to the mirror current, the sense circuit configured to extract the binary data; and a serial receiver coupled to the sense circuit, the serial receiver configured to accumulate the binary data, and store the binary data as the digital word. The controller may further comprise a digital memory configured to store the digital word.

In the example voltage regulator, the power device may be a transistor.

Another example is a method of programming a voltage regulator, the method comprising: providing, to an input terminal of a voltage regulator, a supply voltage; serially communicating binary data to a controller within the voltage regulator by modulating current drawn from the voltage regulator through an output terminal, the modulating by a device external to the voltage regulator; and then controlling, by the voltage regulator, a regulated voltage applied to the output terminal, with a characteristic of the regulated voltage controlled by binary data.

In the example method, the characteristic of the regulated voltage may be a magnitude of the regulated voltage.

The example method may further comprise: creating, within the voltage regulator, a mirror current that mirrors an output current provided through the output terminal; and sensing, within the mirror current, the binary data as current pulses. Sensing the binary data may further comprise: creating a voltage across an impedance using the mirror current; and driving, by a comparator, sensed pulses to a comparator output of the comparator based on the voltage across the impedance.

In the example method, the voltage regulator may be exactly three terminals, the input terminal, the output terminal, and a reference voltage terminal.

The example method may further comprise: sensing, by a device external to the voltage regulator, a magnitude of the regulated voltage; and then serially communicating updated binary data to the controller by modulating current drawn through the output terminal; and then controlling, by the voltage regulator, the regulated voltage applied to the output terminal, with a characteristic of the regulated voltage controlled by the updated binary data.

BRIEF DESCRIPTION OF THE DRAWINGS

For a detailed description of example embodiments, reference will now be made to the accompanying drawings in which.

DEFINITIONS

Figure 1:
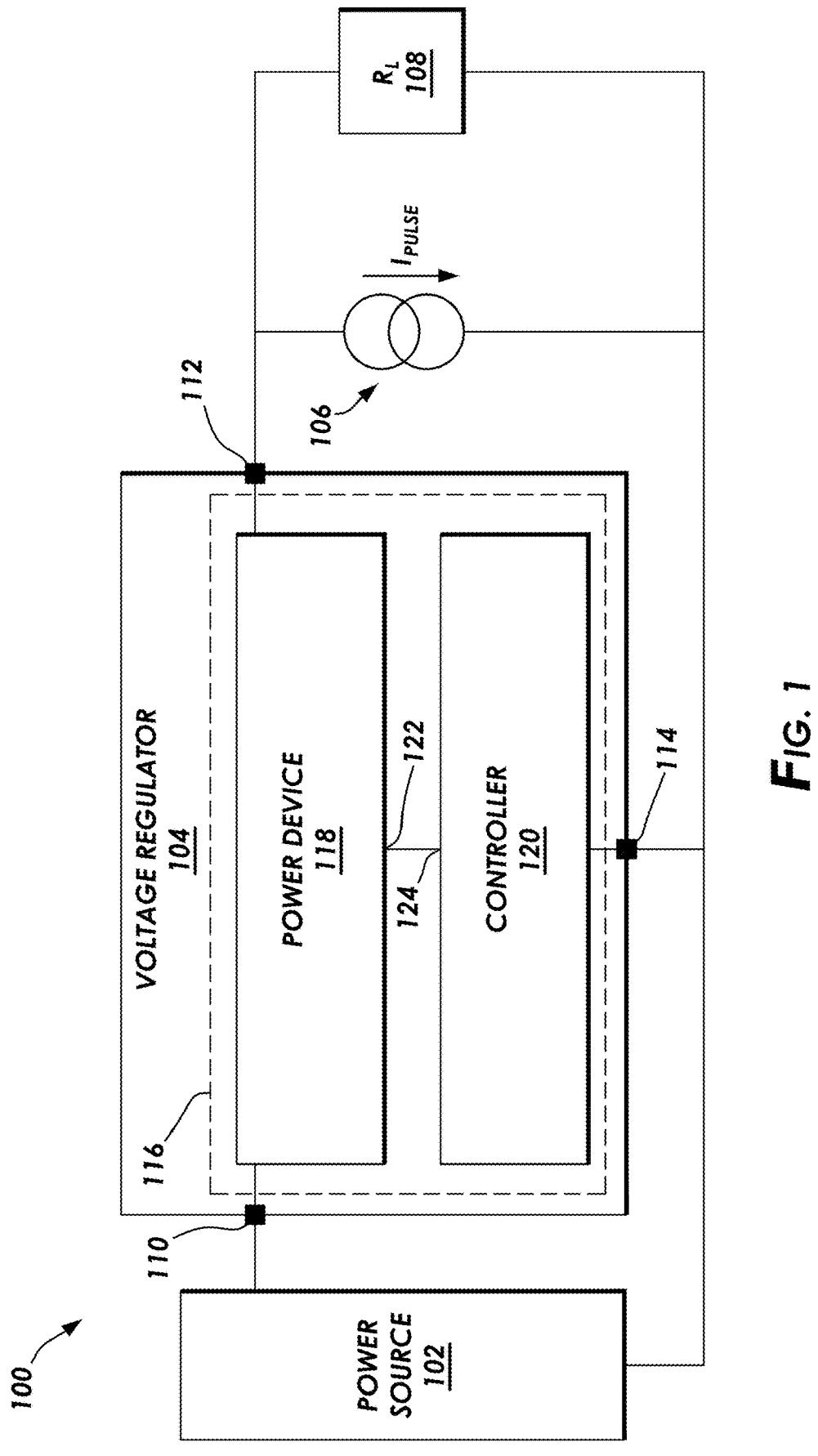
FIG. 1 shows, in block diagram form, an example system in the form of a regulator system.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions. To be clear, an initial reference to "a [referent]", and then a later reference for antecedent basis purposes to "the [referent]", shall not obviate the fact the recited referent may be plural.

In relation to electrical devices (whether stand alone or as part of an integrated circuit), the terms "input" and "output" refer to electrical connections to the electrical devices, and shall not be read as verbs requiring action. For example, a differential amplifier (such as an operational amplifier) may have a first differential input and a second differential input, and these "inputs" define electrical connections to the operational amplifier, and shall not be read to require inputting signals to the operational amplifier.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As alluded to in the Background section, related-art devices have electrical terminals that serve dual functions. One example is an enable terminal that may both act as a communication terminal and act as the enable terminal that, when asserted, enables operation of the device. However, the enable terminal and other such dual-use terminals are high impedance terminals for use in the voltage domain. That is, an external device attempting to communicate through the enable terminal drives a series of voltage pulses being bits in the serial communication. Likewise, the external device attempting to enable the controlled device may apply a predetermined high voltage (e.g., 3V, 5V) or a predetermined low voltage (e.g., ground) to communicate the enable command. Being a high impedance terminal, the systems within the controlled device sense voltages developed on the enable terminal.

Other electrical terminals of a device may have characteristics that make the terminals unsuitable for voltage domain use. Consider, as an example, a three-terminal device, such as a low drop out (LDO) voltage regulator. An LDO voltage regulator defines only three terminals or exactly three terminals: an input voltage or $V_{IN}$ terminal, an output voltage or $V_{OUT}$ terminal, and a ground or common terminal. The $V_{IN}$ terminal is designed to couple to an unregulated voltage having a magnitude above the setpoint for the LDO voltage regulator. The $V_{IN}$ terminal of an LDO voltage regulator is associated with high capacitance—the capacitance either being internal to LDO voltage regulator, external to the LDO voltage regulator, or both. Capacitive terminals are not suitable for voltage domain-based serial communication because voltage domain-based driving circuits may not have sufficient current sourcing/sinking capability to overcome the capacitance—time constants associated with the charging/discharging the capacitance may severely limit the data rate.

With respect to the $V_{OUT}$ terminal of the example LDO voltage regulator, the $V_{OUT}$ terminal is considered a low impedance terminal. That is, in operation the LDO voltage regulator drives a current to the $V_{OUT}$ terminal to regulate the voltage to the setpoint. Any attempt to drive a different voltage to the $V_{OUT}$ terminal results in the voltage regulator adjusting the driven current. Thus, low impedance terminals are not suitable for voltage domain-based driving circuits. Finally, the ground terminal is not suitable for data communications, as changes in the reference voltage applied to the ground terminal changes operation of the LDO voltage regulator.

Various examples are directed to current sinking serial communication. More particularly, various examples are directed to communicating with or programming a packaged semiconductor product, such as an application-specific integrated circuit (ASIC), in situations in which there are a limited number of electrical terminals available on an exterior surface of the packaging. More particularly still, various examples are directed to serial communication with devices inside the packaged semiconductor product by selective current sinking through a low-impedance electrical terminal. The packaged semiconductor product thereafter operates based on serial communication. The various embodiments were developed in the context of a programmable three-terminal device in the form an LDO voltage regulator. The description that follows is based on the developmental context; however, the developmental context shall not be read as a limitation on the applicability the example methods and systems.

FIG. 1 shows, in block diagram form, an example system. In particular, FIG. 1 shows a regulator system 100 comprising a power source 102, a voltage regulator 104, a communications circuit 106, and a load $R_L$ 108. The example power source 102 may be any suitable upstream power source, such as a battery, battery system, switching power supply, or an upstream voltage regulator. Regardless, the power source 102 provides an unregulated voltage to the voltage regulator 104. It will be understood that the "unregulated voltage" is in reference to a regulated voltage to be provided by the voltage regulator 104; however, the voltage provided by the power source 102 may be regulated to have a magnitude, or ranges of magnitudes, above the setpoint for the voltage regulator 104.

The example voltage regulator 104 defines only three or exactly three terminals. In particular, the voltage regulator 104 defines a $V_{IN}$ terminal or input terminal 110, a $V_{OUT}$ terminal or output terminal 112, and a common or ground terminal 114. The example voltage regulator 104 is a packaged semiconductor product, and the input terminal 110, the output terminal 112, and the ground terminal 114 are electrically exposed or electrically accessible on an exterior of the packaging. For example, the terminals may be electrical leads or electrical pins of a TO-220 packaging.

Still referring to FIG. 1, and now specifically to the internal components of the voltage regulator 104. In example cases, the functionality of the voltage regulator 104 is implemented on a single semiconductor die or semiconductor substrate 116. That is, at the semiconductor processing stage, many voltage regulator circuits may be simultaneously constructed on a semiconductor wafer. After fabrication is complete, the various device are cut or singulated. Each singulated die is then packaged as a semiconductor product, with the various electrical connections on the die (e.g., bond pads) electrically coupled to the externally accessible terminals. In the example of FIG. 1, all the components reside on a single semiconductor substrate 116; however, in other cases the various devices may be constructed on separate substrates and combined into a single packaged product, sometimes referred to as multi-chip module.

The example voltage regulator 104 comprises a functional circuit in the example form a linear regulator or power device 118, along with a controller 120. In particular, the power device 118 is coupled to the input terminal 110, the output terminal 112, and the controller 120 by way of a control input 122. While only a single control input 122 is shown, multiple control inputs may be implemented depending on the design of the power device 118, including control inputs conveying digital words from the controller 120 to the power device 118. Based on voltages and/or currents provided from controller 120, the power device 118 may implement a control function in the example form of driving current from the input terminal 110 to the output terminal 112 to control the voltage at the output terminal 112 as the load R$_L$ 108 changes over time. The power device 118 may take any suitable form, such as junction transistor, a field-effect transistor, or a Schotkky diode. The power device 118 is referred to as "linear" because in example cases the control is performed based on operation of the implemented device(s) in a "linear" region, as opposed to switching power converters that utilize controlled device(s) in an on/off sense.

The controller 120 is coupled to the power device 118 by way of a control output 124, including various connections described in greater detail below. The controller 120 is designed and constructed to control the power device to achieve desired regulated voltage depending on state of the system, such as nominal condition regulated voltage, startup sequence, or error states (e.g., overcurrent protection, thermal shutdown). In various examples, the characteristic controlled by the controller 120 may be programmable by an external device, such as during initial setup of the regulator system 100, or as needed during use. The systems that implement the programmable aspects are discussed in greater detail below, after a discussion of the communications circuit 106.

Still referring to FIG. 1, the example regulator system 100 comprises the communications circuit 106, illustratively shown as a current source sinking current or drawing current from the output terminal 112. In some cases, the current source may draw the current in parallel with the load current drawn by the load R$_L$ 108; however, in other cases the load current may be zero or a relatively low setup current (e.g., one milliamp) during periods when the communication circuit 106 is communicating with the controller 120. In particular, the communication circuit 106 is designed and constructed to draw current as a series of pulses, I$_{PULSE}$ in the figure, to send binary data to the controller 120. More specifically still, the communications circuit 106 may send one or more bits of data to the controller 120, where the one or more bits of data (e.g., a digital word) may indicate how the characteristic of the regulated voltage should be controlled. In the example case of the characteristic being the magnitude of the regulated voltage, the controller 120 may receive the digital word, store the digital word in a memory (not shown in FIG. 1), and then implement the control change to control the magnitude of the regulated voltage to the setpoint.

Figure 2:
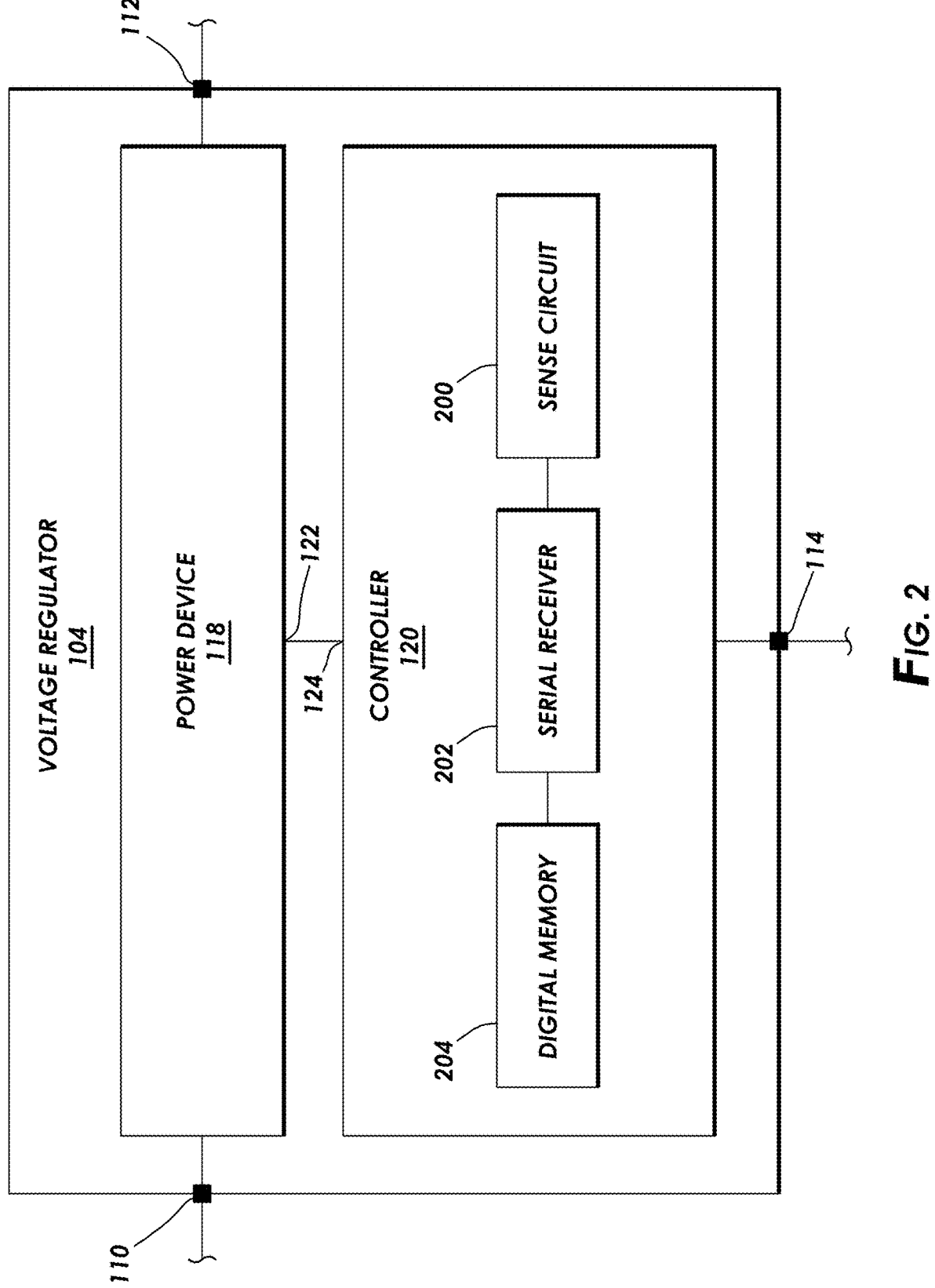
FIG. 2 shows, in block diagram form, the example voltage regulator in greater detail.

FIG. 2 shows, in block diagram form, the example voltage regulator 104 in greater detail. In particular, FIG. 2 shows the example voltage regulator 104 that includes the power device 118 and the controller 120. The example controller 120 comprises a sense circuit 200, a serial receiver 202, and a digital memory 204. The digital memory 204 is designed and constructed to store a digital word, such as a digital word comprising two or more bits. As will be discussed in greater detail below, the functional circuit in the example form of the power device 118 is designed and constructed to control current flow from the input terminal 110 to the output terminal 112 based directly or indirectly on the digital word. It follows that, operation of the power device 118 (e.g., setpoint voltage for the output terminal 112) may be controllable and/or modifiable based on the digital word.

Figure 3:
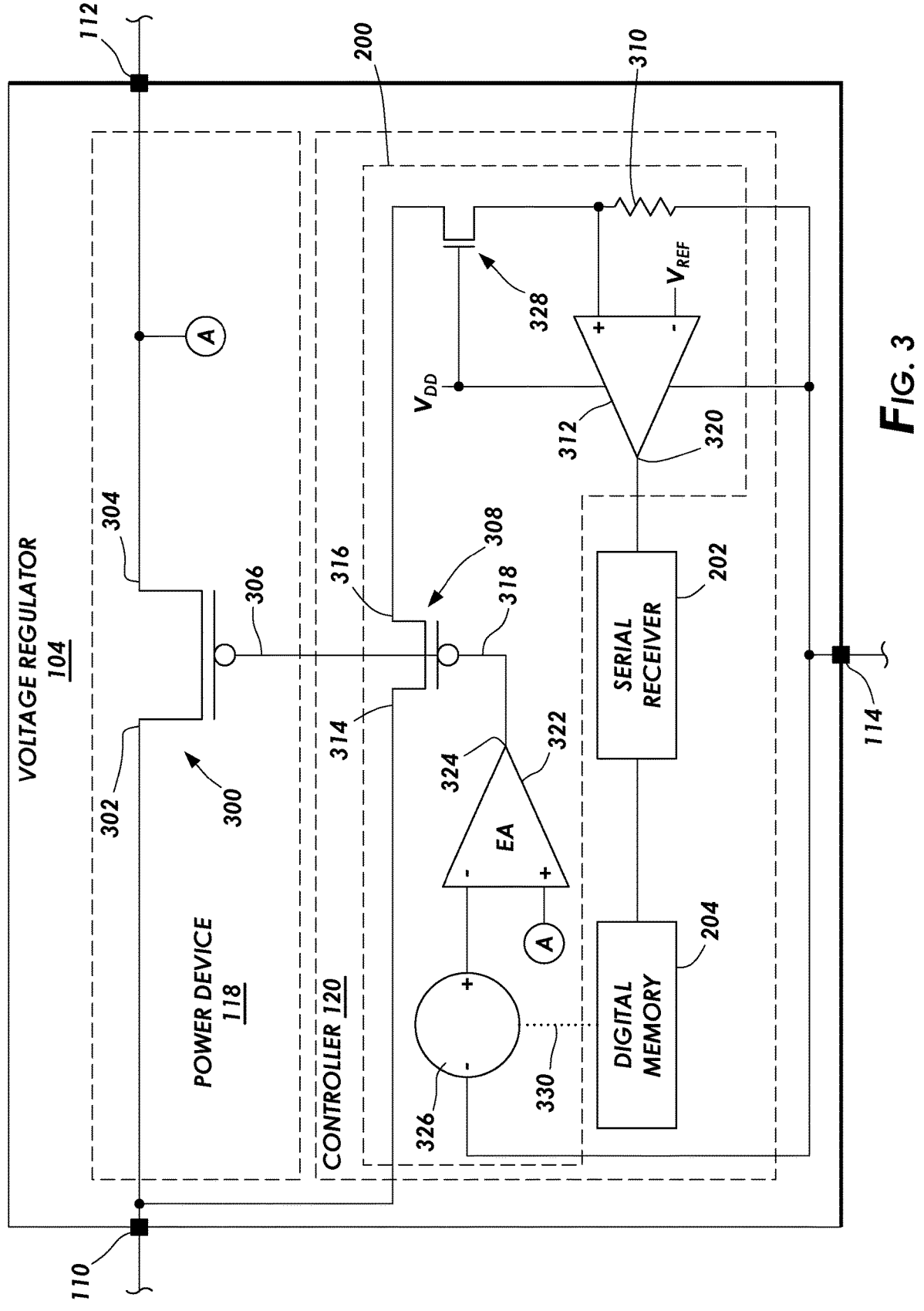
FIG. 3 shows a simplified electrical schematic of the example voltage regulator.

The sense circuit 200 may be coupled to the output terminal 112, as shown on FIG. 3. However, the connection to the output terminal 112 is not shown on FIG. 2 so as not to unduly complicate the figure. The sense circuit 200 is designed and constructed to extract binary data provided as current pulses drawn through the output terminal 112, such as drawn by the communication circuit 106 (FIG. 1). In some cases, the output power provided to the downstream load RL 108 (FIG. 1) may be zero during periods of time when the communication circuit 106 is pulling current to create the current pulses. Stated otherwise, in some cases the only output current provided from the voltage regulator 104 when the communication circuit 106 is active is the current drawn to create the pulses. In other cases, however, creation of the current pulses by the communication circuit 106 may take place simultaneously with the voltage regulator 104 providing load current to the load RL 108. In the simultaneous cases, the current pulses thus "ride" on top of the load current provided to the load RL 108. In one specific example, the load current may be set to a predetermined low value, well below full load current, to accommodate sensing the current pulses (e.g., the load current may be 10 mA, or 100 mA, or 1000 mA).

Still referring to FIG. 2, the example controller 120 may further comprise the serial receiver 202 coupled to the sense circuit 200. The serial receiver 202 may be designed and constructed to accumulate the binary data extracted or sensed by the sense circuit 200, form therewith a digital word, and communicate the digital word to the digital memory 204. In one example, the serial receiver 202 may implement a Serial Peripheral Interconnect (SPI) protocol. SPI is a synchronous serial communication protocol that supports full duplex communication, though in example cases only communication from the serial receiver 202 to the digital memory 204 may be implemented.

In some cases, programming the voltage regulator 104 to have a particular output voltage supplied at the output terminal 112 may be non-deterministic process. That is, because of process variations in constructing voltage regu-

US 12,651,952 B2

Page 7 of content / Page 8 lators, a particular value of the digital word stored in the digital memory may result in different output voltages for different voltage regulators. For example, each power device 118 may have slightly different doping or current conduction areas based on semiconductor process variations. Thus, programming the voltage regulator 104 to have a particular output voltage may involve communicating a first digital word by the communication circuit 106 (FIG. 1), allowing the voltage regulator 104 to settle into steady-state operation based the first digital word, and then measuring the output voltage. If the output voltage based on the first digital word is high or low, then the voltage regulator may be programmed again by sending an updated digital word that is saved to the digital memory. The process repeats until the desired output voltage is achieved.

FIG. 3 shows a simplified electrical schematic of the example voltage regulator 104. In particular, the voltage regulator 104 includes the power device 118 and the controller 120. The boxes delineating the power device 118 and the controller 120 are shown as dashed lines in FIG. 3 to avoid confusion with various electrical connections. The power device 118 of this example comprises a field effect transistor (hereafter FET 300) defining a source 302 coupled to the input terminal 110, a drain 304 coupled to the output terminal 112, and a gate 306. Based on a voltage applied to the gate 306, the FET 300 effectively defines a variable resistance to regulate the voltage drop across the FET 300 and thus the voltage at the output terminal 112. Using FET 300 as the power device is merely an example, as other types of transistors (e.g., junction transistors) and other types of power devices may be used.

The example controller 120 comprises the sense circuit 200, the serial receiver 202, and the digital memory 204. The example sense circuit 200 comprises a comparator 312 along with a current mirror implemented using FET 308 and an impedance, the impedance illustratively shown as a sense resistor 310. The impedance may take other forms, such as diode-connected FET or a FET-based current source. The FET 308 defines a source 314 coupled to the input terminal 110, a drain 316, and a gate 318 coupled to the gate 306 of the FET 300. Putting aside for now the FET 328, a first lead of the sense resistor 310 is coupled to the drain 316 of the FET 308, and the second lead of the sense resistor 310 is coupled to the ground terminal 114. In the arrangement of FIG. 3, the FET 308 and sense resistor 310 form a current mirror with respect to the current through the FET 300. That is, current flow through FET 308 "mirrors" current flow through the FET 300 based the shared gate connection and shared connection to the input terminal 110. More particularly still, the mirror current through the FET 308 will be proportional to the current through the FET 300, but the magnitude of the mirror current may be a small, fixed percentage (e.g., 1%, 0.1%) of the magnitude of the current through the FET 300. Thus, the mirror current flows through the FET 308 and then through the sense resistor 310, creating a sense voltage across the sense resistor 310.

The example sense circuit 200 of FIG. 3 comprises comparator 312. The comparator 312 defines a non-inverting input coupled the first lead of the sense resistor 310, an inverting input coupled to a reference voltage V$_{REF}$, and a compare output 320. The comparator 312 is designed and constructed to sense voltage across the sense resistor 310 with respect to the reference voltage V$_{REF}$, and drive the compare output 320 with voltage pulses representing the binary data. That is, as the sense voltage rises above reference voltage V$_{REF}$, the comparator drives the voltage on the upper rail to the compare output 320. As the sense voltage falls below the reference voltage V$_{REF}$, the comparator 312 pulls the compare output 320 to the voltage on the lower rail. In the example arrangement of FIG. 3, the upper rail of comparator 312 is coupled to the internal supply voltage V$_{DD}$, and the lower rail of the comparator 312 is coupled the ground terminal 114, and thus the voltage pulses driven by the comparator 312 swing between V$_{DD}$ and ground. The serial receiver 202 accumulates the pulses into a digital word, and sends the digital word to the digital memory 204 for storage.

Still referring to FIG. 3, the example controller 120 further comprises an error amplifier 322 (EA in the figure). The error amplifier 322 defines a control output 324 coupled to the gates of the FET 300 and FET 308. The error amplifier 322 also has an inverting input coupled to a reference source 326, and a non-inverting input coupled to the output terminal 112 (the connection shown by bubble "A"). Though shown as a comparator, the error amplifier 322 may implement a closed-loop control scheme, where an error signal is created based on the voltage supplied by the reference source 326 and the output voltage, and the error amplifier 322 then drives a gate signal to the control output 324 using the control scheme, such as a Type 1, 2, or 3 control system (e.g., proportional-integral-differential (PID) control).

The reference source 326 is effectively a variable voltage source, with the supplied voltage controlled by the digital word stored in the digital memory 204, as shown by dashed line 330. Thus, by changing the digital word stored in the digital memory, the voltage provided the reference source 326 changes, which effectively changes the setpoint voltage for the voltage regulator 104.

Returning to FET 328. The FET 328 defines a drain coupled to the drain 316 of FET 308, a source coupled to the first lead of the sense resistor 310, and a gate coupled to the internal supply voltage V$_{DD}$. One example function of the FET 328 is related to the rating of the voltage regulator 104. That is, the voltage regulator 104 may be a low voltage device (e.g., 5 V or less), a medium voltage device (e.g., 5V to 50V), or a high voltage device (e.g., greater than 50V). Each of these example ranges utilizes different semiconductor construction techniques to accommodate the applied voltages. For medium and high voltage devices, the example FET 328 may be designed and constructed to form a voltage clamp such that the sense resistor 310 and comparator 312 may be uniform across the various voltage ranges. That is, while higher mirror current may flow in the medium- and high-voltage devices, the FET 328 forms a voltage divider with the sense resistor 310 such that a uniform sense voltage range, and uniform reference voltage V$_{REF}$, may be used for the devices regardless of voltage rating. It follows, for low voltage devices, the FET 328 may be omitted.

Figure 4:
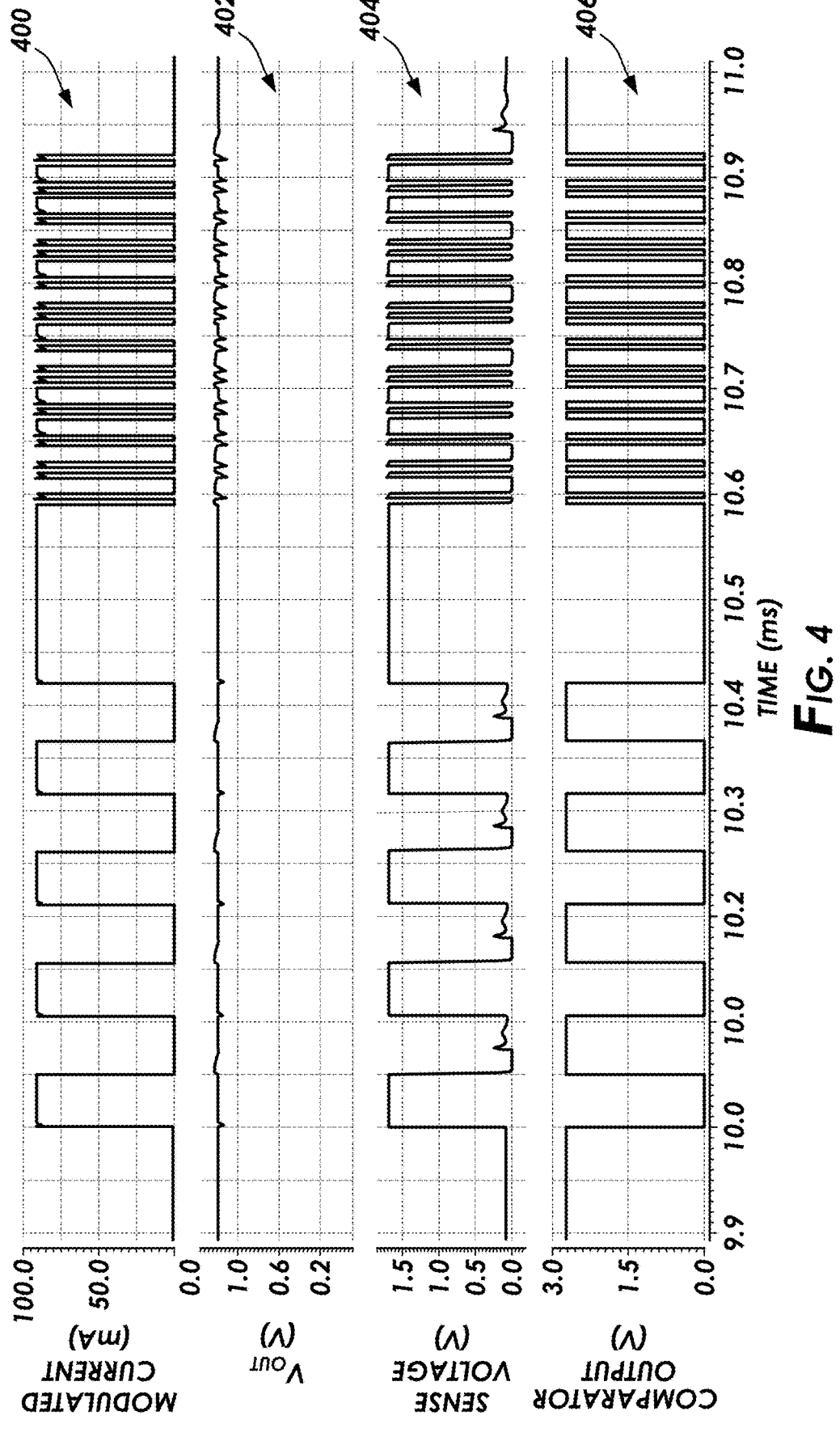
FIG. 4 shows a set of waveforms plotted over corresponding time.

The specification now turns to example waveforms. FIG. 4 shows a set of waveforms plotted with corresponding time. In particular, FIG. 4 shows a plot of modulated current 400, output voltage V$_{OUT}$ 402, sense voltage 404, and comparator output 406. Turning first to the modulated current 400, the modulated current 400 is the current drawn by the communication circuit 106 (FIG. 1), with the current "sunk" from voltage regulator 104 (FIG. 1). That is, the modulated current 400 represents binary data communicated to the voltage regulator 104 from the communications circuit 106. Between times 10.00 ms and 10.42 ms, the data rate is at a first, slower data rate. Between times 10.59 ms and 10.92 ms, the data rate is at a second, faster data rate. In the example case, binary data sent at the first, slower data rate may represent timing or header pulses, signaling an upcoming binary data transfer. The binary data sent at the second, faster data rate may represent the data to be transferred, such as the digital word to be stored in the digital memory 204 (FIG. 2). The digital word may be encoded in the modulated current in any suitable form, such as binary or direct encoding, pulse-width modulation, or pulse-position modulation.

The output voltage $V_{OUT}$ 402 signal shows how the current-sinking communication system may affect the output voltage of the voltage regulator 104. In the example of FIG. 4, the modulated current 400 is drawn through the voltage regulator 104 during periods when there is no load current through the load $R_L$ 108 (FIG. 1). Sinking or drawing of the modulated current 400 affects the output voltage $V_{OUT}$ 402, as shown being relatively small voltage excursions caused by the modulated current 400. In other cases, a non-zero load current may be drawn by the load $R_L$ 108 during periods when the modulated current 400 is being drawn, and in those cases the effect on output voltage $V_{OUT}$ 402 may be even smaller than shown in FIG. 4.

Still referring to FIG. 4, and in particular the sense voltage 404. The example sense voltage 404 is voltage developed across the sense resistor 310 as caused by the mirror current. The mirror current is scaled version of the modulated current 400. In the example case of FIG. 4 in which there is no load current through the load $R_L$ 108 during creation of the modulated current 400, the mirror current is a scaled version of the modulated current 400, ranging from zero voltages to a predetermined percentage of the modulated current. The sense voltage 404 is applied to the non-inverting input of the comparator 312 (FIG. 3).

Turning now to the comparator output 406. The comparator 312 compares the sense voltage at the non-inverting output to the reference voltage $V_{REF}$ at the inverting input, and drives the compare output 320 accordingly. The comparator output 406 of FIG. 4 thus represents the binary data sensed by the comparator 312, and the binary data provided to the serial receiver 202 (FIG. 2) for forwarding to the digital memory 204 (FIG. 2).

Figure 5:
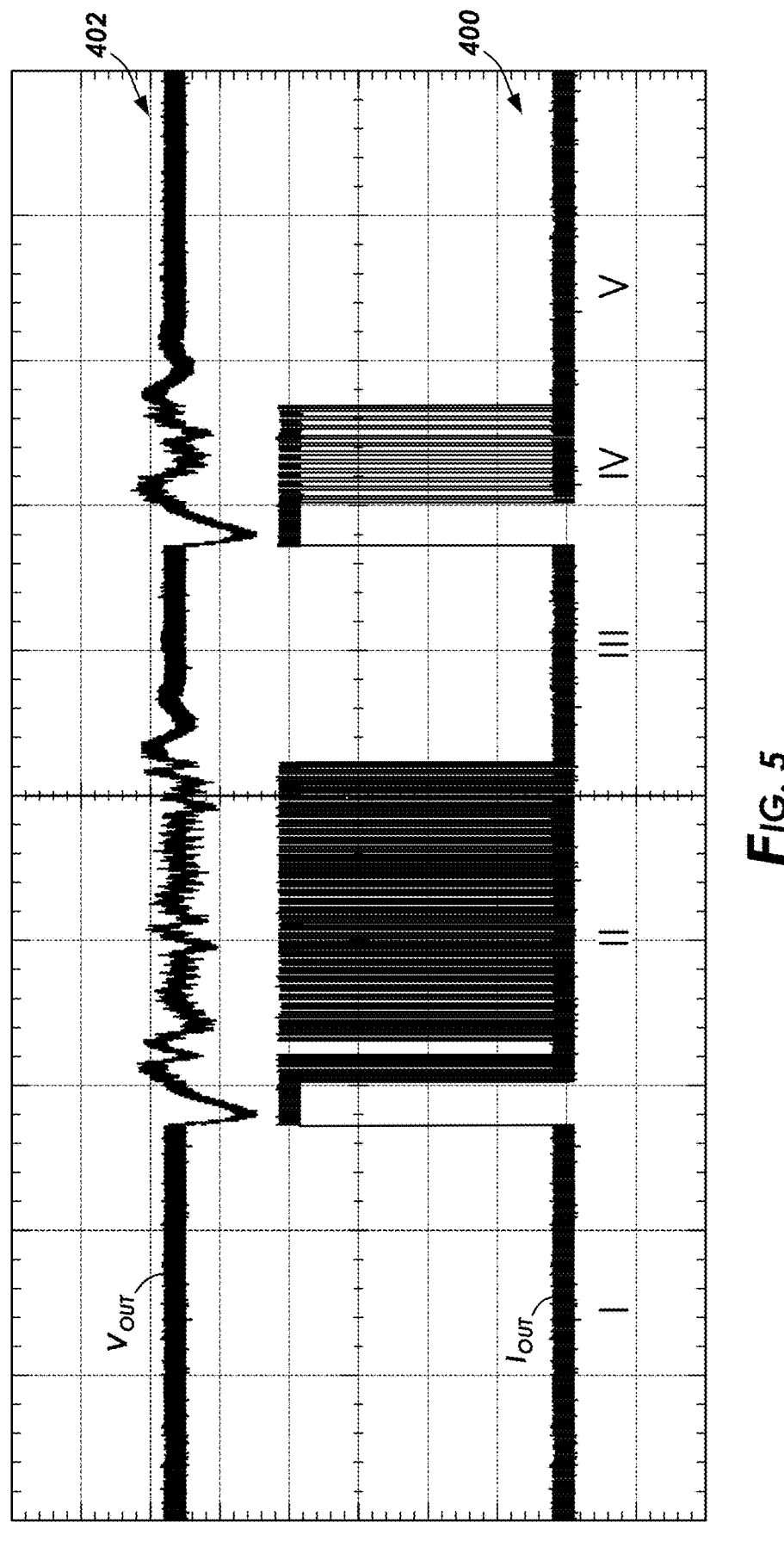
FIG. 5 shows a set of waveforms plotted over corresponding time.

FIG. 5 shows a set of waveforms plotted over corresponding time to show various example phases of programming the voltage regulator. In particular, FIG. 5 shows the output voltage VOUT 402 and the modulated current 400 (in the figure, IOUT). FIG. 5 shows five example stages or phases. Phase I is a non-programming stage. That is, during the example Phase I the voltage regulator 104 regulates voltage according to a previous programming or a default programming. The example Phase II is a programming mode, in which an external programming device forces digital information into the voltage regulator 104, such as by the communication circuit 106 modulating current drawn through the voltage regulator 104. The example Phase III is a reading mode, in which an external programming device reads analog information from the voltage regulator 104. In one case, the analog information read is the magnitude of the output voltage VOUT; however, in other cases the voltage regulator 104 may provide or drive the magnitude of the output voltage VOUT to be representative of another parameter, such as the magnitude of the internal voltage supply VDD. The example Phase IV is a follow-up programming mode. For example, the external programming device may supply a digital word to the voltage regulator 104, and then monitor the voltage regulator 104 response during Phase III. If the first digital word does not generate the desired response (e.g., the desired output voltage VOUT), the external programming device may re-program the voltage regulator 104 by providing an updated digital word to the digital memory 204. Finally, the example Phase V represents a second reading mode in which the results of the re-programming are evaluated.

Figure 6:
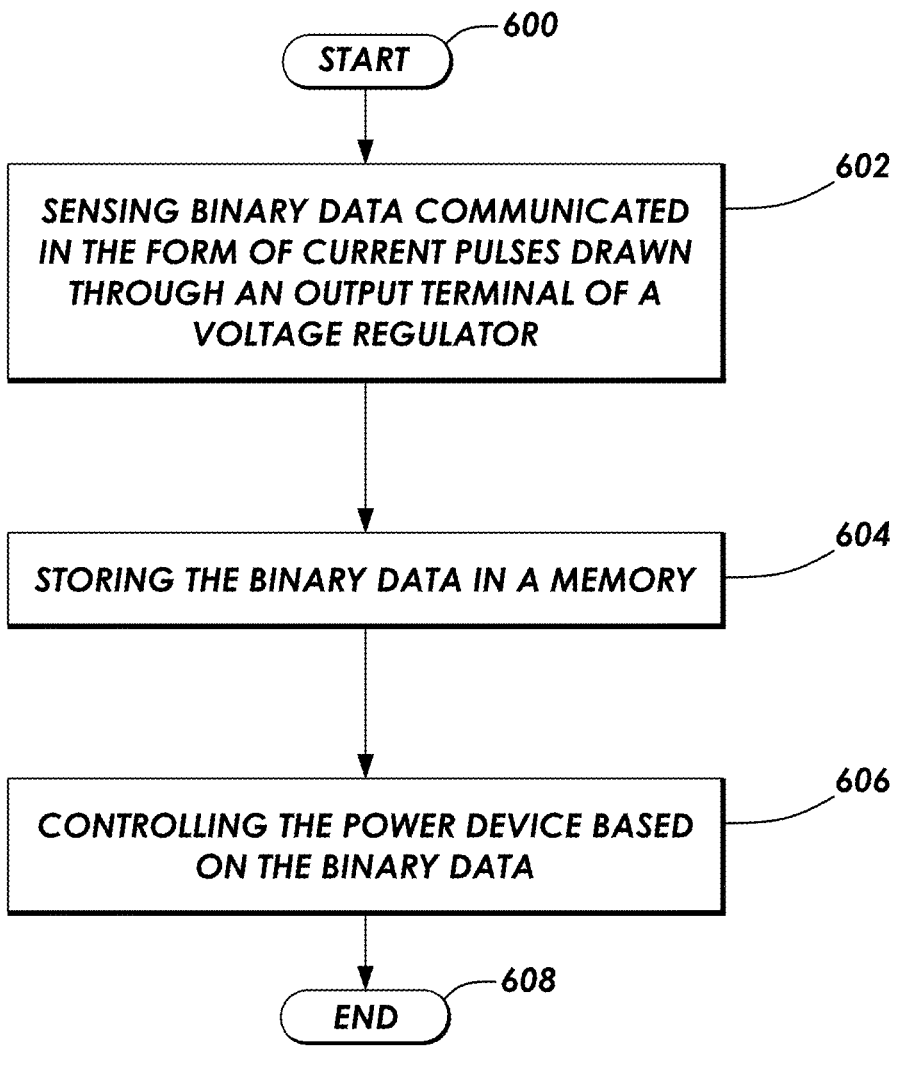
FIG. 6 shows a method in accordance with at least some embodiments.

FIG. 6 shows a method in accordance with at least some embodiments. In particular, the example method may be implemented by a controller within a voltage regulator. The example method starts (block 600) and comprises: sensing binary data communicated in the form of current pulses drawn through the output terminal of a voltage regulator (block 602); storing the binary data in a memory (block 604); and controlling the power device based on the binary data (block 606). Thereafter the method ends (block 608).

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A packaged semiconductor product comprising:
    an input terminal electrically accessible on an exterior surface of a packaging;
    an output terminal electrically accessible on an exterior surface of a packaging;
    a digital memory disposed within the packaged semiconductor product and configured to store a digital word;
    a functional circuit coupled to the input terminal, the output terminal, and the digital memory, the functional circuit configured to perform a control function with respect to a signal on the input terminal, and the control function modifiable based on the digital word;
    a sense circuit coupled to the output terminal, the sense circuit configured to extract binary data provided as current pulses drawn through the output terminal; and
    a serial receiver coupled to the sense circuit, the serial receiver configured to accumulate the binary data into an updated digital word, and store the updated digital word to the digital memory.

2. The packaged semiconductor product of claim 1 wherein the functional circuit further comprises a voltage regulator, and wherein a setpoint for the voltage regulator is controlled by at least a portion of the digital word.

3. The packaged semiconductor product of claim 1 wherein the functional circuit is a power device.

4. The packaged semiconductor product of claim 3 wherein the power device is a transistor.

5. The packaged semiconductor product of claim 2 having exactly three externally-accessible terminals, being the input terminal, the output terminal, and a ground or common terminal.

6. The packaged semiconductor product of claim 1 wherein the sense circuit further comprises:
    a current mirror configured to create a sense current proportional to an output current provide through the output terminal;
    an impedance through which the sense current flows; and
    a comparator coupled to the impedance, the comparator configured to compare a sense voltage across the impedance to a reference voltage, and drive, to a compare output, voltage pulses representing the binary data.

7. A voltage regulator comprising:
an input terminal;
an output terminal;
a power device coupled between the input terminal and the output terminal, and the power device defining a control input;
a controller coupled to the control input and the output terminal, the controller configured to:
    sense binary data communicated as current pulses drawn through the output terminal;
    store the binary data in a memory as a digital word; and
    control the power device based on the digital word.

8. The voltage regulator of claim 7 wherein the controller further comprises:
    a current mirror associated with the power device and configured to generate a mirror current proportional to an output current provided to the output terminal;
    a sense circuit coupled to the mirror current, the sense circuit configured to extract the binary data; and
    a serial receiver coupled to the sense circuit, the serial receiver configured to accumulate the binary data, and form the binary data as the digital word.

9. The voltage regulator of claim 8 wherein the controller further comprises a digital memory configured to store the digital word.

10. The voltage regulator of claim 7 wherein the power device is a transistor.

11. A method of programming a voltage regulator, the method comprising:
    providing, to an input terminal of the voltage regulator, a supply voltage;
    serially communicating binary data to a controller within the voltage regulator by modulating current drawn from the voltage regulator through an output terminal, the modulating by a device external to the voltage regulator; and then
controlling, by the voltage regulator, a regulated voltage applied to the output terminal, with a characteristic of the regulated voltage controlled by binary data.

12. The method of claim 11 wherein the characteristic of the regulated voltage is a magnitude of the regulated voltage.

13. The method of claim 11 further comprising:
creating, within the voltage regulator, a mirror current that mirrors an output current provided through the output terminal; and
sensing, within the mirror current, the binary data as current pulses.

14. The method of claim 13 wherein sensing the binary data further comprises:
    creating a voltage across an impedance using the mirror current; and
    driving, by a comparator, sensed pulses to a comparator output of the comparator based on the voltage across the impedance.

15. The method of claim 11 wherein the voltage regulator has exactly three terminals, the input terminal, the output terminal, and a reference voltage terminal.

16. The method of claim 11 further comprising:
    sensing, by a device external to the voltage regulator, a magnitude of the regulated voltage; and then
    serially communicating updated binary data to the controller by modulating current drawn through the output terminal; and then
controlling, by the voltage regulator, the regulated voltage applied to the output terminal, with a characteristic of the regulated voltage controlled by the updated binary data.

\* \* \* \* \*